US012670438B2

(12) United States Patent (10) Patent No.: US 12,670,438 B2

Teranishi (45) Date of Patent: Jun. 30, 2026

(54) MACHINE LEARNING SYSTEM, METHOD, INFERENCE APPARATUS AND COMPUTER-READABLE STORAGE MEDIUM FOR RESISTING MEMBERSHIP INFERENCE ATTACKS

(71) Applicant: NEC Corporation, Tokyo (JP)

(72) Inventor: Isamu Teranishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 716 days.

(21) Appl. No.: 18/020,588

(22) PCT Filed: Aug. 19, 2020

(86) PCT No.: PCT/JP2020/031237

§ 371 (c)(1),
(2) Date: Feb. 9, 2023

(87) PCT Pub. No.: WO2022/038704

PCT Pub. Date: Feb. 24, 2022

(65) Prior Publication Data

US 2023/0351250 A1 Nov. 2, 2023

(51) Int. Cl.
*G06N 20/00* (2019.01)

(52) U.S. Cl.
CPC .................................... *G06N 20/00* (2019.01)

(58) Field of Classification Search
CPC ...... G06N 20/00; G06N 3/0464; G06N 3/045;
G06N 3/09; G06N 3/094; G06N 3/08;
G06F 21/6245
See application file for complete search history.

(56) References Cited

U.S. PATENT DOCUMENTS 10,225,277 B1 3/2019 Shintre et al.
2020/0143079 A1 5/2020 Sohn et al.

OTHER PUBLICATIONS

International Search Report for PCT Application No. PCT/JP2020/031237, mailed on Nov. 24, 2020.
Reza Shokri et al., "Membership Inference Attacks Against Machine Learning Models", arXiv:1610.05820v2 [cs.CR] Mar. 31, 2017, pp. 1-16, <URL : https://arxiv.org/pdf/1610.05820.pdf>.
Ahmed Salem et al., "ML-Leaks: Model and Data Independent Membership Inference Attacks and Defenses on Machine Learning Models", arXiv:1806.01246v2 [cs.CR] Dec. 14, 2018, pp. 1-15, <URL : https://arxiv.org/abs/1806.01246>.

(Continued)

*Primary Examiner* — Pei Yong Weng

(74) *Attorney, Agent, or Firm* — Sughrue Mion, PLLC

(57) ABSTRACT

A machine learning method including a first learning phase for training parameters $\theta$ of a learning model f by performing machine learning using a first dataset as a training data with a correct answer label; and a second learning phase for training parameters $\tau$ of a defender u and parameters $\omega$ of identifier h by performing machine learning using member data contained in the first dataset and non-member data contained in a second dataset. The second learning phase alternately performs, a first step for updating the parameters $\omega$ of the identifier h using the identification result when the first input result and the second input result are input to the identifier h; and a second step for updating the parameters $\tau$ of the defender u using the first output result, the second output result and the identification result.

9 Claims, 7 Drawing Sheets

(56) References Cited

OTHER PUBLICATIONS

Milad Nasr et al., "Machine Learning with Membership Privacy using Adversarial Regularization", arXiv:1807.05852v1 [stat.ML] Jul. 16, 2018, pp. 1-14, <URL : https://arxiv.org/pdf/1807.05852.pdf>.

Jinyuan Jia et al., "MemGuard : Defending against Black-Box Membership Inference Attacks via Adversarial Examples", arXiv:1909.10594v3 [cs.CR] Dec. 18, 2019, pp. 1-16, <URL : https://arxiv.org/pdf/1909.10594.pdf>.

Milad Nasr et al., "Machine Learning with Membership Privacy using Adversarial Regularization", Proceedings of the 2018 ACM SIGSAC Conference on Computer and Communications Security, Oct. 15-19, 2018, pp. 634-646, <URL: https ://dl.acm.org/dol/abs/10.1145/3243734.3243855>.

INFERENCE

```
                                              F                    P
  ┌─────────┐    ┌──────────────────┐    ┌──────────────────┐
 ( TARGET  ) →   │    INFERENCE     │ →  │   DEFENDER  u    │ →
 (  DATA   )     │     UNIT  f      │    │  (PARAMETERS  τ)  │
  └─────────┘    │  (PARAMETERS  θ) │    │                  │
                 └──────────────────┘    └──────────────────┘
```

Fig. 3

MACHINE LEARNING SYSTEM, METHOD, INFERENCE APPARATUS AND COMPUTER-READABLE STORAGE MEDIUM FOR RESISTING MEMBERSHIP INFERENCE ATTACKS

This application is a National Stage Entry of PCT/JP2020/031237 filed on Aug. 19, 2020, the contents of all of which are incorporated herein by reference, in their entirety.

TECHNICAL FIELD

The present disclosure relates to machine learning.

BACKGROUND ART

Non-Patent literatures 1 and 2 disclose a Membership Inference attack (MI attack) for causing confidential information (for example, customer information, trade secrets, etc.) used for learning from learned parameters of machine learning to be leaked. For example, Non-Patent literature 1 discloses a method of MI attack under the condition that access to an inference algorithm is possible. MI attacks use the "overtraining" phenomenon of machine learning. Overtraining is a phenomenon in which machine learning adapts to data used for learning too much. The tendency of the output in the case where the data used for the learning is input to the inference algorithm is different from that in the case where the data not used for the learning is input to the inference algorithm due to the overtraining. MI attackers exploit this difference to determine whether the data is used for learning or not.

Non-Patent literature 3 discloses a learning algorithm that is resistant to MI attacks. Specifically, the non-patent literature 3 uses an arbitrary known inference algorithm f for machine learning and an identifier h for identifying whether or not data input to f is data used for training f. Then, each parameter is learned in an adversarial manner to increase the inference accuracy of the inference algorithm f and the resistance against the MI attacks.

Non-Patent literature 4 discloses a method called Mem-Guard. In this method, as a countermeasure against a black box attack under the condition that the learned parameter of the inference algorithm of the target of the attack are not known, the process of misleading the classifier of the attacker is performed.

CITATION LIST

Non Patent Literature

[Non-Patent Literature 1] Reza Shokri, Marco Stronati, Congzheng Song, Vitaly Shmatikov: "Membership Inference Attacks Against Machine Learning Models" (URL: https://arxiv.org/pdf/1610.05820.pdf)
[Non-Patent Literature 2] Ahmed Salem, Yang Zhang, Mathias Humbert, Pascal Berrang, Mario Fritz, Michael Backes: "ML-Leaks: Model and Data Independent Membership Inference Attacks and Defenses on Machine Learning Models" (URL: https://arxiv.org/abs/1806.01246)
[Non-Patent Literature 3] Milad Nasr, Reza Shokri, Amir Houmansadr, "Machine Learning with Membership Privacy using Adversarial Regularization" (URL: https://arxiv.org/pdf/1807.05852.pdf)
[Non-Patent Literature 4] Jinyuan Jia, Ahmed Salem, Michael Backes, Yang Zhang, Neil Zhenqiang Gong, "MemGuard: Defending against Black-Box Membership Inference Attacks via Adversarial Examples" (URL: https://arxiv.org/pdf/1909.10594.pdf)

SUMMARY OF INVENTION

Technical Problem

In machine learning, data used for learning (also known as training data) may contain confidential information such as customer information and trade secrets. There is a possibility that the confidential information used for the learning may be caused to leak from the learned parameters of the machine learning by a MI attack. For example, an attacker who has illegally obtained a learned parameter may guess the learning data. Alternatively, even if the learned parameters are not leaked, an attacker can predict the learned parameters by repeatedly accessing the inference algorithm. Then, the training data may be predicted from the predicted learned parameters.

In Non-Patent literature 3, accuracy and attack resistance are in a trade-off relationship. Specifically, parameters that determine the degree of a trade-off between accuracy and attack resistance are set. Therefore, it is difficult to improve both accuracy and attack resistance.

The method of Non-Patent literature 4 provides a protection by adding noise on the inference result. Therefore, there is a problem that noise affects the inference result regardless of the defense performance.

One of objects of the present disclosure is to provide an inference apparatus, a inference method, and a recording medium having high resistance to MI attacks and high accuracy.

Solution to Problem

A machine learning method according to the present disclosure is a machine learning method; including a first learning phase for training parameters $\theta$ of a learning model f by performing machine learning using a first dataset as a training data with a correct answer label; and a second learning phase for training parameters $\tau$ of a defender u and parameters $\omega$ of identifier h by performing machine learning using member data contained in the first dataset and non-member data contained in a second dataset; in the second learning phase, the member data or the non-member data is randomly selected as an input data, the learning model f outputs a first output result when the member data or the non-member data is input to the learning model f as the input data, the defender u modifies the first output result, and then outputs a second output result, and the identifier h outputs an identification result identifying whether the input data is the member data or the non-member data based on the first or second output result, the second learning phase alternately performs, a first step for updating the parameters $\omega$ of the identifier h using the identification result when the first input result and the second input result are input to the identifier h; and a second step for updating the parameters $\tau$ of the defender u using the first output result, the second output result and the identification result.

A machine learning system according to the present disclosure is a machine learning system; including; a parameter learning unit configured to train parameters $\theta$ of a learning model f by performing machine learning using a first dataset as a training data with a correct answer label in a first learning phase; a first update unit configured to update parameters $\tau$ of a defender u by performing machine learning using member data contained in the first dataset and non-member data contained in a second dataset in a second learning phase; and a first update unit configured to update parameters ω of identifier h by performing machine learning using the member data contained in the first dataset and the non-member data contained in a second dataset in the second learning phase; in the second learning phase, the member data or the non-member data is randomly selected as an input data, the learning model f outputs a first output result when the member data or the non-member data is input to the learning model f as the input data, the defender u modifies the first output result, and then outputs a second output result, and the identifier h outputs an identification result identifying whether the input data is the member data or the non-member data based on the first or second output result, the second learning phase alternately performs, a first step for updating the parameters ω of the identifier h using the identification result when the first input result and the second input result are input to the identifier h; and a second step for updating the parameters τ of the defender u using the first output result, the second output result and the identification result.

A computer readable medium according to the present disclosure is a non-transitory computer-readable storage medium storing a program that causes a computer to execute an inference method: the method comprising a first learning phase for training parameters θ of a learning model f by performing machine learning using a first dataset as a training data with a correct answer label; and a second learning phase for training parameters τ of a defender u and parameters ω of identifier h by performing machine learning using member data contained in the first dataset and non-member data contained in a second dataset; in the second learning phase, the member data or the non-member data is randomly selected as an input data, the learning model f outputs a first output result when the member data or the non-member data is input to the learning model f as the input data, the defender u modifies the first output result, and then outputs a second output result, and the identifier h outputs an identification result identifying whether the input data is the member data or the non-member data based on the first or second output result, the second learning phase alternately performs, a first step for updating the parameters ω of the identifier h using the identification result when the first input result and the second input result are input to the identifier h; and a second step for updating the parameters τ of the defender u using the first output result, the second output result and the identification result.

An inference apparatus according to the present disclosure is an inference apparatus comprising an inference unit which is a machine learning model configured to perform an inference using parameters θ; and a defender u which is a machine learning model configured to modify a first output result indicating an inference result of the inference unit using parameters t, and then output a second output result; the parameters θ of the inference unit are trained in a first learning phase in which a machine learning is performed using a first data set with a correct answer label as training data; the parameters τ of the defender u and parameters ω of an identifier h are trained in a second learning phase in which a machine learning is performed using member data contained in the first data set and non-member data contained in a second dataset as training data; in the second learning phase, the member data or the non-member data is randomly selected as an input data, the learning model f outputs a first output result when the member data or the non-member data is input to the learning model f as the input data, the defender u modifies the first output result, and then outputs a second output result, and the identifier h outputs an identification result identifying whether the input data is the member data or the non-member data based on the first or second output result, the second learning phase alternately performs, a first step for updating the parameters ω of the identifier h using the identification result when the first input result and the second input result are input to the identifier h; and a second step for updating the parameters τ of the defender u using the first output result, the second output result and the identification result.

Advantageous Effects of Invention

According to the present disclosure, it is possible to provide a machine learning system, a machine learning method, an inference apparatus, and a recording medium having highly resistant to MI attacks and high accuracy.

BRIEF DESCRIPTION OF DRAWINGS

FIG. 3 is a diagram for explaining processing at the time of inference in the machine learning system according to the first embodiment.

DESCRIPTION OF EMBODIMENTS

Figure 1:
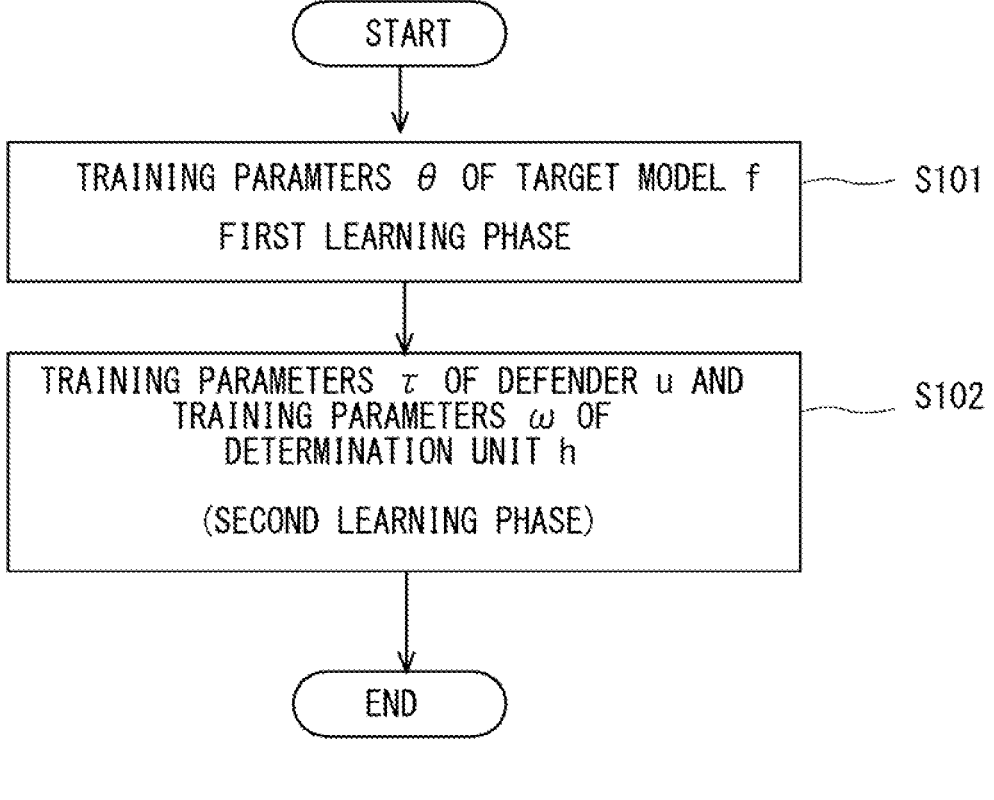
FIG. 1 is a flowchart illustrating a machine learning method in accordance with the present disclosure.
Figure 2:
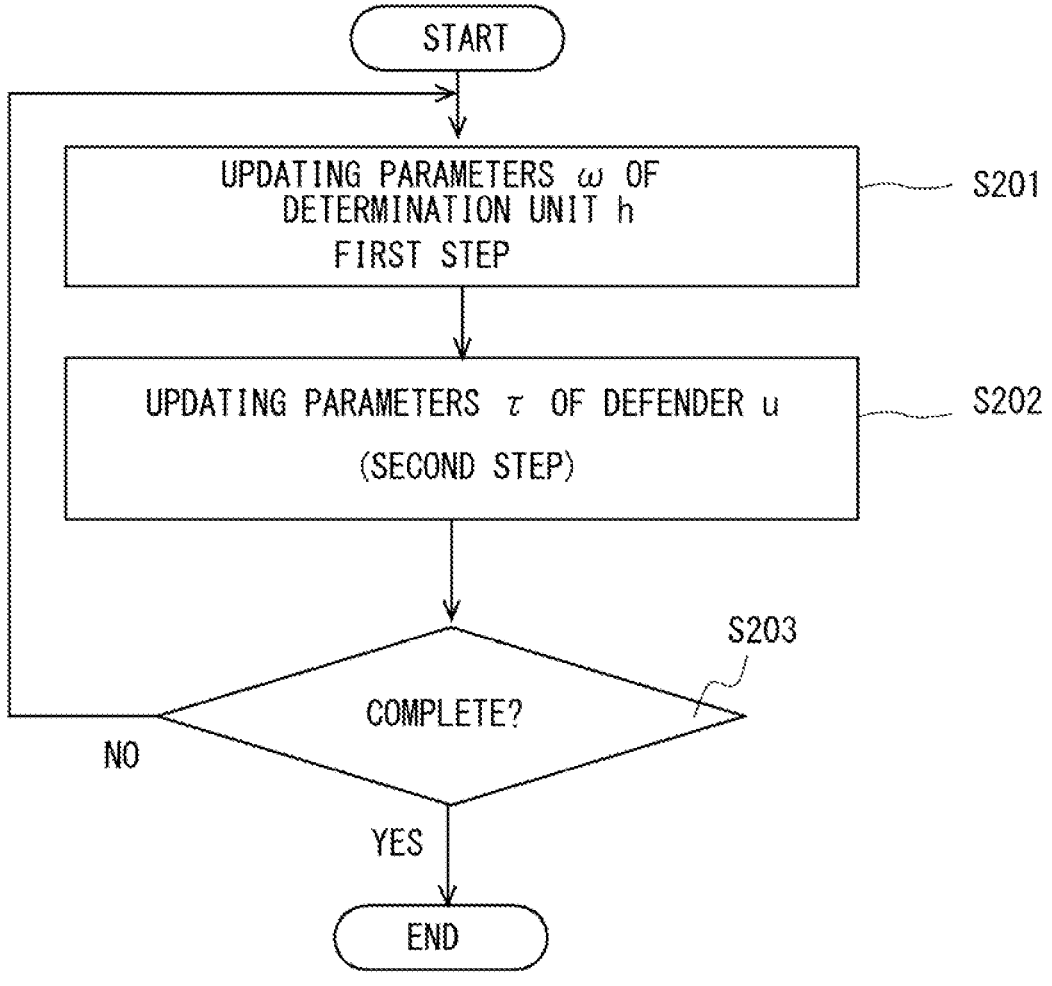
FIG. 2 is a flowchart illustrating a second learning phase of a machine learning method according to the present disclosure.

A machine learning method according to the present embodiment will be described with reference to FIGS. 1 and 2. FIG. 1 is a flowchart showing a machine learning method. FIG. 2 is a flowchart showing a second learning phase of the machine learning method.

First, as a first learning phase, machine learning is performed using a dataset as training data with a correct answer label to train the parameters θ of the learning model f (S 101). Next, as a second learning phase, machine learning is performed using the member data contained in the first dataset and non-member data contained in the second dataset to train the parameters τ of the defender u and the parameters ω of the identifier h (S 102).

The member data or the non-member data is randomly selected as an input data in the second learning phase. The learning model f outputs a first output result when the member data or the non-member data is inputted to the learning model f as the input data in the second learning phase. The defender u modifies the first output result and then outputs a second output result. The identifier h outputs an identification result identifying whether the input data is the member data or the non-member data based on the first output result or the second output result.

The second learning phase includes a first step S201 and a second step S202. In the second learning phase, the first step S201 and the second step S202 are alternately performed until the machine learning is completed (S 203).

In the first step S201, the parameters $\omega$ of the identifier h are updated using the identification result when the first input result and the second input result are input to the identifier h. In the second step S202, the parameters $\tau$ of the defender u are updated using the first output result, the second output result and the identification result.

According to the method described above, machine learning having high resistance to MI attack and high inference accuracy can be realized.

First Embodiment

Figure 3:
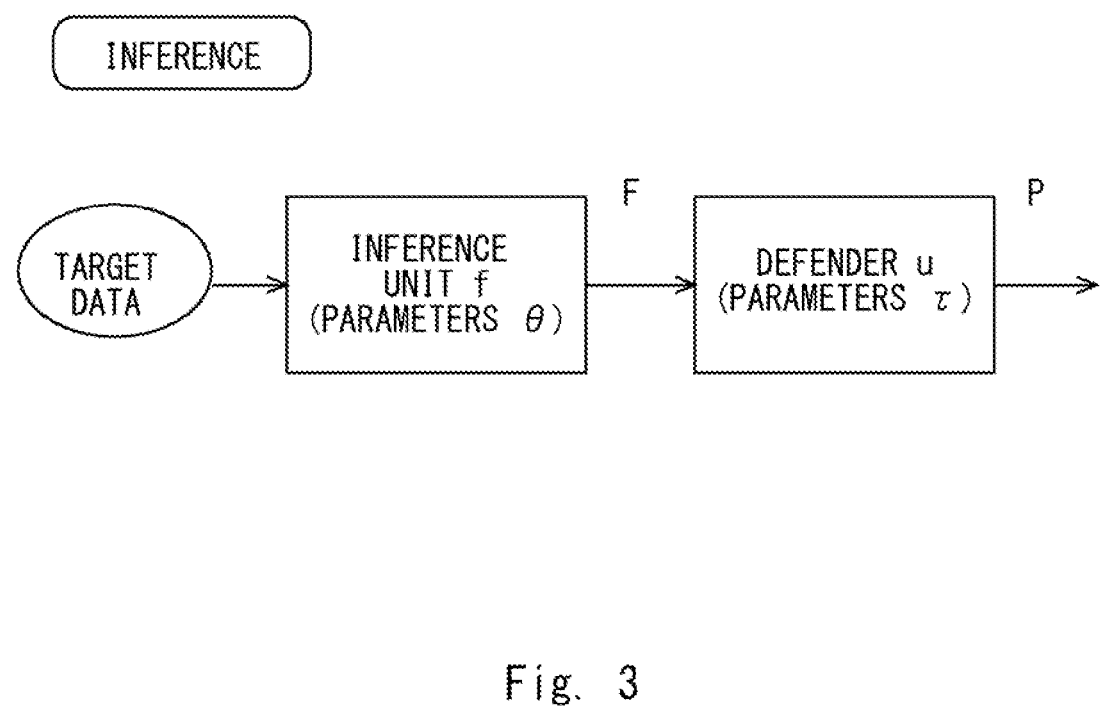

A Machine learning according to the first embodiment will be described with reference to FIG. 3. FIG. 3 is a diagram showing an inference phase using the learning model f and the defender u. The learning model f and the defender u are machine learning models generated by machine learning according to the present embodiment. The learning model f and the defender u function as an inference apparatus using the machine learning models.

Prior to the inference phase, the parameters $\theta$ of the learning model f and the parameters $\tau$ of the defender u are learned by machine learning. The training data used for the training of the learning model f is defined as member data. Data not used for training the learning model f is defined as non-member data. The machine learning of the parameters $\theta$ of the learning model f and the parameters $\tau$ of the defender u will be described later.

The learning model f is an inference unit which performs inference based on the target data. When the target data of inference is inputted to the learning model f, an inference result related to the target data is outputted. The inference result of the learning model f is also referred to as the first output result F. The learning model f may be, for example, a classifier that performs image classification. In this case, the learning model outputs a score vector indicating the probability corresponding to each class. The first output result F output from the learning model f is input to the defender u. The target data may be input to the defender u.

The defender u modifies the first output result F and outputs the modified result as a second output result P. The defender u modifies the first output result F so that the inference result for the member data is not distinguished from the inference result for the non-member data. In other words, the defender u performs defense processing on the first output result F. The defender u outputs the inference result obtained by the defense process as the second output result P.

As described above, the second output result P output from the defender u is an inference result obtained by the defense process. Thus, even if an attacker of the MI attack inputs arbitrary data into the learning model f, leakage of the secret information can be prevented. For the attacker who performs an attack in the form of predicting the parameters $\theta$ of the learning model f, it becomes difficult to extract significant information about the training data from the arbitrary data. Finally, it is possible to make it difficult for an attacker to predict the parameters $\theta$ of the learning model f and the member data (training data). Therefore, the resistance against the MI attack can be improved.

Figure 4:
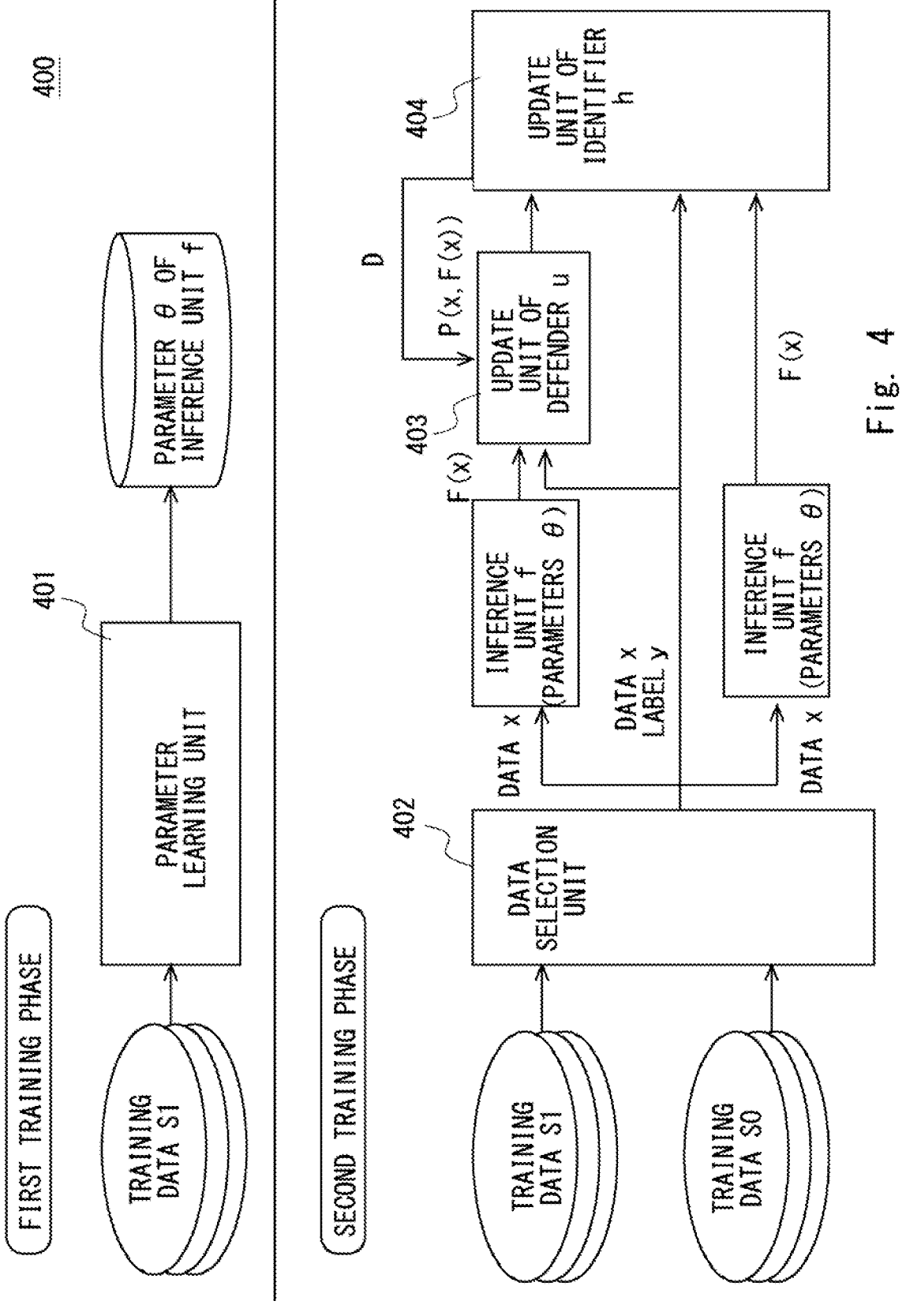
FIG. 4 is a diagram for explaining processing during learning of the machine learning method according to the first embodiment.

Referring to FIG. 4, a machine learning method using a machine learning system will be described. FIG. 4 is a diagram for explaining a machine learning method using the machine learning system 400. The machine learning system 400 trains the parameters $\theta$ of the learning model f, the parameters $\tau$ of the defender u, and parameters $\omega$ of an identifier h. The machine learning system 400 includes the learning model f, a parameter learning unit 401, a data selection unit 402, an update unit 403 of the defender u, and an update unit 404 of the identifier h.

The learning model f is a machine learning algorithm using a convolutional neural network (CNN) or the like. The parameters $\theta$ of the learning model f correspond to the weight or bias value of the convolution layer, the pooling layer, and the total coupling layer of the CNN. Similarly, each of the defender u and the identifier h is a machine learning algorithm using a convolutional neural network (CNN) or the like. The parameters $\tau$ of the defender u and the parameters $\omega$ of the identifier h correspond to weights or bias values of the convolution layer, the pooling layer, and the total coupling layer of the CNN.

The machine learning method includes a first learning phase and a second learning phase. The first learning phase corresponds to step S101 shown in FIG. 1, and the second learning phase corresponds to step S102 shown in FIG. 1.
<First Learning Phase>

In the first learning phase, as shown in FIG. 4, the parameter learning unit 401 performs machine learning of the parameters $\theta$ of the learning model f by using the training data S1. As described above, the training data S1 is member data used for training the learning model f.

Here, the parameter learning unit 401 performs supervised learning on the learning model f. A correct answer label (also called a teacher label, teacher signal, or teacher data) is associated with the training data S1. In other words, the correct answer label (hereinafter simply referred to as label) is given to the training data S1 in advance. For example, when the learning model f is a classifier for performing image classification, the label is data indicating the classification result. In the learning of the parameters $\theta$ of the learning model f, the defense performance against the MI attack does not need to be considered. Therefore, accuracy using the training data S1 can be pursued. As a result, the inference accuracy can be improved.

Specifically, in the first learning phase, the learning model f is subjected to supervised learning using the label. The parameter learning unit 401 optimizes parameters $\theta$ so that the inference result of the learning model f coincides with the label. For example, the machine learning is performed to reduce the loss function between the first output result F indicating the inference result and the label y. When the learning of the learning model f is completed, the parameter learning unit 401 stores parameters $\theta$ of the learning model f in a memory or the like.
<Second Learning Phase>

In the learning second phase, a data selection unit 402 randomly selects data from the training data S1 and training data S0. The training data S0 is different data from the training data S1. The training data S1 is the member data used for training the learning model f. The training data S0 is non-member data not used for training the learning model f.

A dataset of a plurality of training data S1 is defined as a first dataset M, and a dataset of a plurality of training data S0 is defined as a second dataset N. The first dataset M includes a plurality of training data S1. The second dataset N includes a plurality of training data S0. The data selection unit 402 randomly selects data from the first dataset M and the second dataset N. The data x (hereinafter also referred to as selection data x) selected by the data selection unit 402 is used for learning in the second learning phase. That is, the selection data x is input data to be input to the learning model f in the second learning phase.

The machine learning system 400 includes two learning models f. The learning model f is a machine learning model generated in the first learning phase. The parameters θ learned in the first learning phase are set in the learning model f. Accordingly, the two learning models f are the same machine learning model and have the same parameters θ as each other.

The selection data x is input to the two learning models f. Each of the learning models f perform inference based on the selection data x. Each of the learning models f output the inference result as a first output result. An output of each of the learning models f when the selection data x is input to the learning model f is shown as a first output result F (x).

The first output result F (x) from one learning model f is inputted to the update unit 403 of the defender u. The update unit 403 of the defender u updates parameters τ of the defender u. The update unit 403 of the defender u outputs a second output result to the update unit 404 of the identifier h. The output of the defender u when the first output result F (x) and the selection data x are input to the defender u is shown as a second output result P (x, F (x)). The defender u modifies the first output result F (x) based on the selection data x and calculates the second output result P (x, F (x)). The second output result P (x, F (x)) is a result of inference which has been defended by the defender u.

The first output result F (x) from the other learning model f is input to the update unit 404. The update unit 404 updates the parameters ω of the identifier h. The data selection unit 402 outputs the selection data x and the label y to the update unit 404. The label y is the correct answer label (a teacher signal and teacher data) added to the selection data as mentioned above.

The update unit 404 outputs the identification result D of the identifier h to the update unit 403. The identification result D is calculated based on the selection data x, the label y, the first output result F (x), and the second output result P (x, F (x)). For example, the identification result D is data indicating whether the selection data x is the training data S1 or the training data S0. The identification result takes a value of 0 to 1. For example, when the selection data x is the training data S1, the identification result D becomes close to 0, and when the selection data x is the training data S0, the identification result D becomes close to 1.

The update unit 404 updates the parameters ω of the identifier h based on the selection data x, the label y, the first output result F (x), the second output result P (x, F (x)), and the identification result D. The update unit 403 updates the parameters τ of the defender u based on the identification result D, the selection data x, the first output result F (x), and the second output result P (x, F (x)).

In the second learning phase, the following first step ST1 and second step ST2 are alternately executed. In the first step ST1 and the second step ST2, the data selection unit 402 randomly selects the selection data x from the training data S1 or the training data S0. The selection data x is input to the learning model f.

(First Step ST1)

The first step ST1 corresponds to the first step S201 in FIG. 2. The data selection unit 402 randomly selects a set of m (m is an integer greater than or equal to 1) pieces of selection data x and its label y (x1', y1'), . . . (xm', ym') from the second dataset N.

Next, the data selection unit 402 randomly selects the sets (x1, y1), . . . (xm, ym) of m pieces of selection data x and their labels y from the first dataset M. In the first step ST1, the data selection unit 402 selects the same number of data from the first dataset M and the second dataset N.

The update unit 404 updates the parameters ω of the identifier h in the direction in which the following equation (1) increases. The update unit 404 updates the parameters ω by ascending its stochastic gradient. It is to be noted that a symbol "nabla" in the following equations (1) and (2) represents a derivative for each component.

<Equation 1>

$$\nabla_\omega \frac{1}{m} \sum_{i=1}^{m} \log(D(x_i', y_i', F(x_i'))) + \log(1 - D(x_i, y_i, P(x_i, F(x_i)))) \quad (1)$$

Thus, the update unit 404 updates the parameters ω of the identifier h so that the difference between the identification result D when the selection data x is the training data S1 and the identification result D when the selection data x is the training data S1 becomes large. The update unit 404 updates the parameters ω so that the identifier h outputs the correct identification result.

Specifically, the update unit 404 updates the parameters ω of the identifier h by using the first output result, the second output result, and the correct answer label y. The update unit 404 updates the parameters ω so that the identifier h outputs a correct identification result from the first output result F (xi') when the selection data x is the training data S0 and the second output result P (xi, F (xi)) when the selection data x is the training data S1.

(Second Step ST1)

The second step ST2 corresponds to the second step S202 in FIG. 2. The data selection unit 402 randomly selects n (n is an integer greater than or equal to 1) sets (x1', y1'), . . . (xn', yn') of selection data x and its label y from the second dataset N.

Next, the data selection unit 402 randomly selects sets of t (t is an integer greater than or equal to 1) pieces of selection data x and their labels y (x1, y1), . . . (xt, yt) from the first dataset M. Here, t may have the same value as n or different values from n.

The update unit 403 updates the parameters τ of the defender u in the direction in which the following equation (2) decreases. The parameters τ are updated by descending its stochastic gradient by the update unit 403.

<Equation 2>

$$\nabla_\tau \frac{1}{n} \sum_{j=1}^{n} L\big(P(x_j', F(x_j')), F(x_j')\big) + \xi \cdot \frac{1}{t} \sum_{i=1}^{t} \log(D(x_i, y_i, P(x_i, F(x_i)))) \quad (2)$$

L is a loss function between the second output result P (xj', F (xj')) and the first output result F (xj'). Although a symbol "ξ" is a preset parameter, unlike λ in Non-Patent Document 3, it is not a trade-off between accuracy and safety.

When the selection data x is the training data S0, the update unit 403 of the defender u updates the parameters τ so that the difference between the second output result P (xj', F (xj ') and the first output result F (xj') becomes small. Specifically, based on the loss function L between the second output result P (xj', F (xj') and the first output result F (xj') when the selection data x is the training data S0, the update unit 403 updates the parameters t.

The update unit 403 updates the parameters τ so that the identifier h outputs an incorrect identification result. Specifically, when the selection data x is the training data S1, the update unit 403 updates the parameters τ so that the identifier h identifies the selection data x as being the training data S0.

Then, the first step ST1 and the second step ST2 are repeated. That is, the machine learning system 400 alternately executes the first step ST1 and the second step ST2. The first step ST1 and the second step ST2 may constitute batch processing. The machine learning system 400 repeats the first step ST1 and the second step ST2 for a predetermined number of times and alternately updates the parameters ω and the parameters t.

The update unit 403 and the update unit 404 alternately update parameters τ and parameters ω. When the respective updates of parameters ω and τ converge, the machine learning is completed. When the machine learning is completed, the identifier h with the parameters ω and the defender u with the parameters τ are generated. The defender u thus generated becomes the defender u shown in FIG. 3 and is used in the inference phase.

In the embodiment, the update unit 403 and the update unit 404 update the parameters τ and ω, respectively, by performing adversarial learning. By repeatedly and alternately performing steps ST1 and ST2, the identification performance of the identifier h and the defense performance of the defender u are gradually improved. The defender u having a high defense performance which makes it difficult to distinguish the second output result P via the defender u from a first output result F not via the defender u is obtained. That is, so that the identifier h will make it difficult to identify whether the selection data x is the training data S1 or the training data S0, the defender u performs the defense processing on the first output result F. Therefore, the resistance against the MI attack can be improved.

Figure 5:
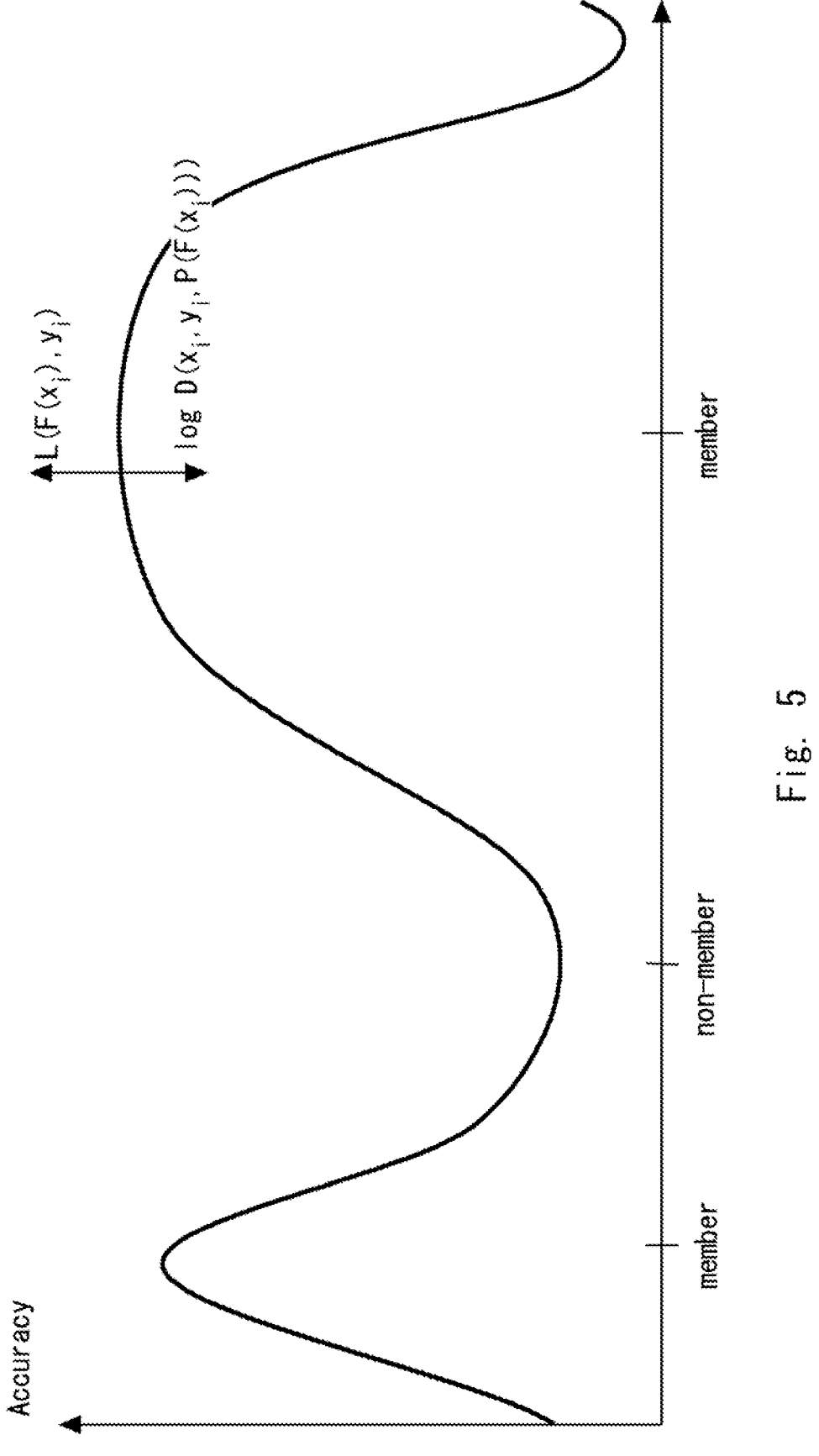
FIG. 5 is a diagram illustrating the inference accuracy of an inference device.
Figure 6:
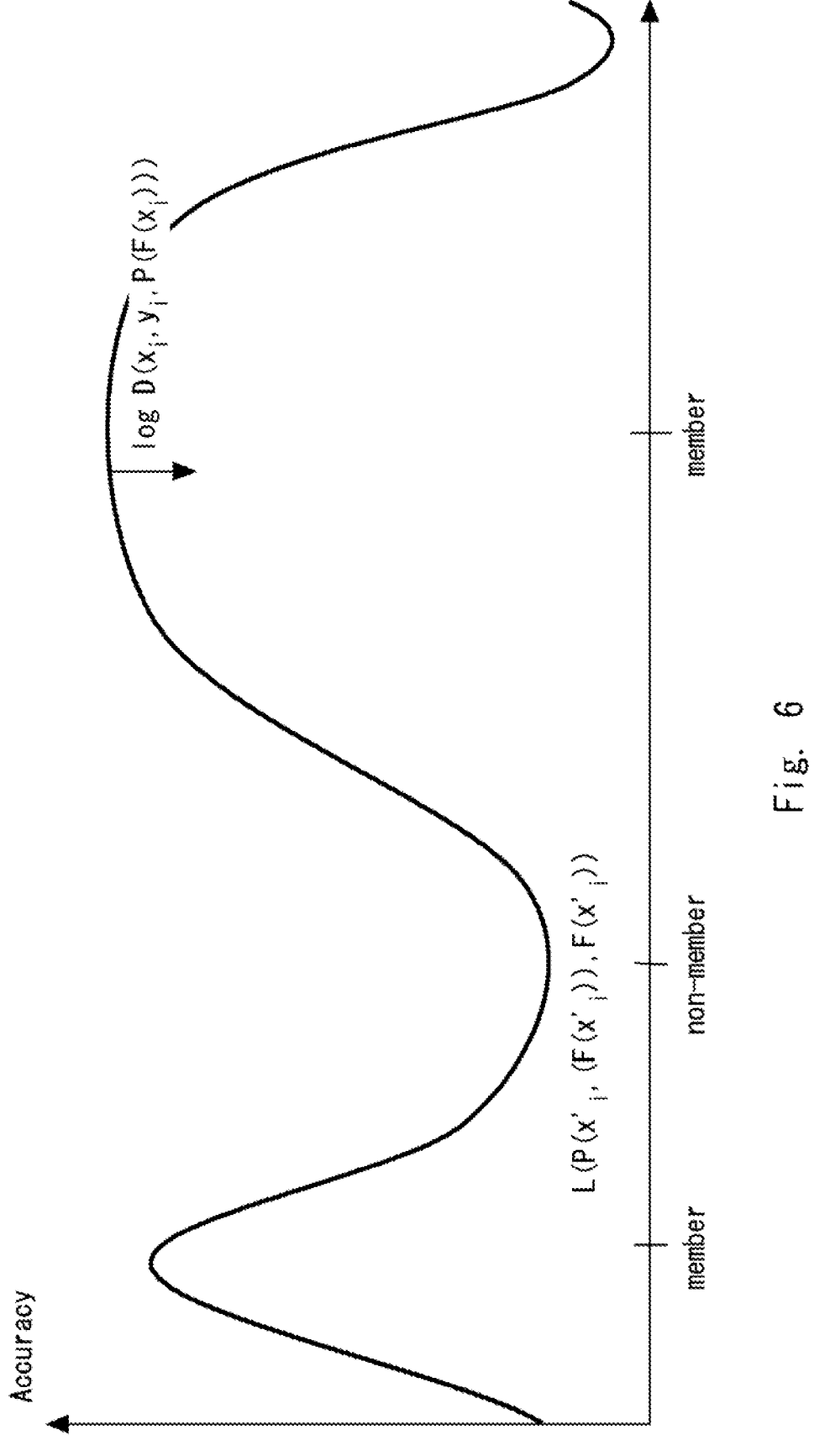
FIG. 6 is a diagram for explaining the inference accuracy when defense processing is performed.

Furthermore, even when the defender u is provided, high inference accuracy can be maintained. This point will be further explained with reference to FIGS. 5 and 6. FIG. 5 is a diagram showing the inference accuracy of the inference result in the learning model f. FIG. 6 is a diagram showing the inference accuracy of the inference result via the defender u.

In the first learning phase, the learning model f is constructed by supervised learning. Therefore, as shown in FIG. 5, the inference accuracy when the target data is the training data S1 can be increased. In other words, as a result of the overtraining, the inference accuracy when the input data the training data S1 is extremely high than and the inference accuracy when the input data is the data other than the training data S1. Therefore, in the learning model f, there is a trade-off relationship between inference accuracy and resistance to MI attacks.

In the second learning phase, the parameters τ of the defender u are updated so as to lower the inference accuracy with respect to the training data S1 while maintaining the inference accuracy with respect to the training data S0.

Therefore, as shown in FIG. 6, it is possible to reduce the inference accuracy which has become extremely high due to overlearning. Since the training data S0 is different from the training data S1, there is no trade-off between the inference accuracy and the resistance to the MI attack.

In the first step, the identifier h outputs the identification result based on the input data, the correct answer label and the first output result when the input data is the non-member data. In the first step, the identifier h outputs the identification result based on the input data, the correct answer label and the second output result when the input data is the member data. Accordingly, it is possible to perform the machine learning effectively.

In the first step, the parameters ω are updated such that the identifier h outputs a correct identification result from the first output result when the input data is the non-member data and the second output result when the input data is the member data. In the second step, the parameters τ are updated based on a loss function between the first output result and the second output result when the input data is the non-member data. Accordingly, it is possible to perform the machine learning effectively.

In the second step, the parameters τ are updated such that the identifier identifies the input data as the non-member data when the input data is the member data. Accordingly, it is possible to perform the machine learning effectively.

Thus, the defender u is generated by adversarial training. The learning model f with the defender u can also be used as a machine learning model. As a result, a machine learning model having high inference accuracy and high resistance to an MI attack can be realized.

In the above embodiments, each of the components f the machine learning system can be implemented by a computer program. That is, the learning model f, the defender u, the identifier h, and the update unit can each be implemented by a computer program. Also, the learning model f, the defender u, the identifier h, and the update unit may not physically comprise a single device, but may be distributed among a plurality of computers.

Figure 7:
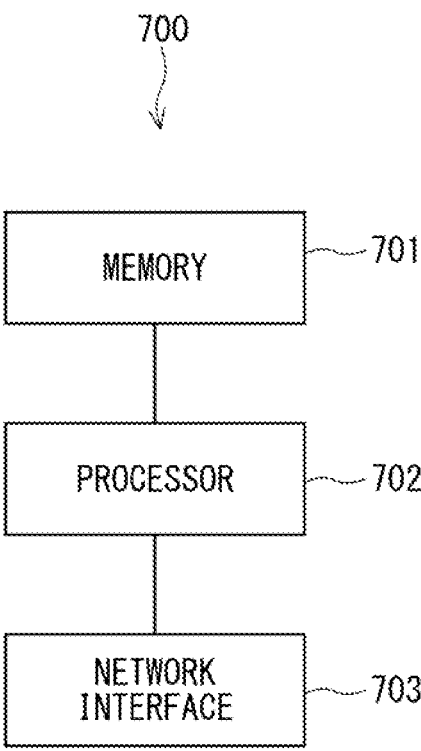
FIG. 7 is a diagram showing a hardware configuration of the apparatus according to the present embodiment.

Next, a hardware configuration of the machine learning apparatus will be described. FIG. 7 is a block diagram showing an example of a hardware configuration of the machine learning apparatus 700. As shown in FIG. 7, the machine learning apparatus 700 includes, for example, at least one memory 701, at least one processor 702, and a network interface 703.

The network interface 703 is used to communicate with other apparatuses through a wired or wireless network. The network interface 703 may include, for example, a network interface card (NIC). The machine learning apparatus 700 transmits and receives data through the network interface 703. For example, the machine learning apparatus 700 may acquire the selection data x and the label y.

The memory 701 is formed by a combination of a volatile memory and a nonvolatile memory. The memory 701 may include a storage disposed remotely from the processor 702. In this case, the processor 702 may access the memory 701 through an input/output interface (not shown).

The memory 701 is used to store software (a computer program) including at least one instruction executed by the processor 702. The memory 701 may store the learning model for the defender u. The memory 701 may store the machine learning model including the learning model f and the defender u.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

REFERENCE SIGNS LIST f learning model
u defender
h identifier
700 machine learning apparatus
701 network interface
702 memory
703 processor

What is claimed is:

1. A machine learning method, comprising:
a first learning phase for training parameters θ of a learning model f by performing machine learning using a first dataset as a training data with a correct answer label; and
a second learning phase for training parameters τ of a defender u and parameters ω of identifier h by performing machine learning using member data contained in the first dataset and non-member data contained in a second dataset, wherein the member data is used in the first learning phase and the non-member data is not used in the first learning phase;
in the second learning phase,
the member data or the non-member data is randomly selected as an input data,
the learning model f outputs a first output result when the member data or the non-member data is input to the learning model f as the input data,
the defender u modifies the first output result, and then outputs a second output result, wherein the defender performs defense processing the first output result so that an inference result for the member data is not distinguished from an inference result for the non-member data, and
the identifier h outputs an identification result identifying whether the input data is the member data or the non-member data based on the first output result or the second output result,
the second learning phase alternately performs,
a first step for updating the parameters ω of the identifier h using the identification result when a first input result and a second input result are input to the identifier h, and
a second step for updating the parameters τ of the defender u using the first output result, the second output result and the identification result.

2. The machine learning method according to claim 1, wherein in the first step,
the identifier h outputs the identification result based on the input data, the correct answer label and the first output result when the input data is the non-member data, and
the identifier h outputs the identification result based on the input data, the correct answer label and the second output result when the input data is the member data.

3. The machine learning method according to claim 1, wherein, in the first step, the parameters ω are updated such that the identifier h outputs a correct identification result from the first output result when the input data is the non-member data and the second output result when the input data is the member data, and
wherein, in the second step, the parameters τ are updated based on a loss function between the first output result and the second output result when the input data is the non-member data.

4. The machine learning method according to claim 3, wherein, in the second step, the parameters τ are updated such that the identifier h identifies the input data as the non-member data when the input data is the member data.

5. A machine learning system, comprising:
a parameter learning unit configured to train parameters θ of a learning model f by performing machine learning using a first dataset as a training data with a correct answer label in a first learning phase;
a first update unit configured to update parameters τ of a defender u by performing machine learning using member data contained in the first dataset and non-member data contained in a second dataset in a second learning phase; and
a second update unit configured to update parameters ω of identifier h by performing machine learning using the member data contained in the first dataset and the non-member data contained in the second dataset in the second learning phase, wherein the member data is used in the first learning phase and the non-member data is not used in the first learning phase;
in the second learning phase,
the member data or the non-member data is randomly selected as an input data,
the learning model f outputs a first output result when the member data or the non-member data is input to the learning model f as the input data,
the defender u modifies the first output result, and then outputs a second output result, wherein the defender performs defense processing the first output result so that an inference result for the member data is not distinguished from an inference result for the non-member data, and
the identifier h outputs an identification result identifying whether the input data is the member data or the non-member data based on the first output result or the second output result,
the second learning phase alternately performs,
a first step for updating the parameters ω of the identifier h using the identification result when a first input result and a second input result are input to the identifier h, and
a second step for updating the parameters τ of the defender u using the first output result, the second output result and the identification result.

6. The machine learning system according to claim 5, wherein in the first step,
the identifier h outputs the identification result based on the input data, the correct answer label and the first output result when the input data is the non-member data, and
the identifier h outputs the identification result based on the input data, the correct answer label and the second output result when the input data is the member data.

7. The machine learning system according to claim 5, wherein, in the first step, the parameters ω are updated such that the identifier h outputs a correct identification result from the first output result when the input data is the non-member data and the second output result when the input data is the member data, and wherein, in the second step, the parameters $\tau$ are updated based on a loss function between the first output result and the second output result when the input data is the non-member data.

8. The machine learning system according to claim 7, wherein, in the second step, the parameters $\tau$ are updated such that the identifier h identifies the input data as the non-member data when the input data is the member data.

9. A non-transitory computer-readable storage medium storing a program that causes a computer to execute an inference method, the method comprising:

a first learning phase for training parameters $\theta$ of a learning model f by performing machine learning using a first dataset as a training data with a correct answer label; and a second learning phase for training parameters $\tau$ of a defender u and parameters $\omega$ of identifier h by performing machine learning using member data contained in the first dataset and non-member data contained in a second dataset, wherein the member data is used in the first learning phase and the non-member data is not used in the first learning phase;

in the second learning phase, the member data or the non-member data is randomly selected as an input data, the learning model f outputs a first output result when the member data or the non-member data is input to the learning model f as the input data, the defender u modifies the first output result, and then outputs a second output result, wherein the defender performs defense processing the first output result so that an inference result for the member data is not distinguished from an inference result for the non-member data, and the identifier h outputs an identification result identifying whether the input data is the member data or the non-member data based on the first output result or the second output result, the second learning phase alternately performs, a first step for updating the parameters $\omega$ of the identifier h using the identification result when a first input result and a second input result are input to the identifier h; and a second step for updating the parameters $\tau$ of the defender u using the first output result, the second output result and the identification result.

\* \* \* \* \*